(12) United States Patent
Hiraguchi et al.

(10) Patent No.: US 6,739,539 B2
(45) Date of Patent: May 25, 2004

(54) RECORDING TAPE CARTRIDGE (75) Inventors: Kazuo Hiraguchi, Kanagawa (JP); Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 45 days.

(21) Appl. No.: 10/270,381

(22) Filed: Oct. 15, 2002

(65) Prior Publication Data
US 2003/0071159 A1 Apr. 17, 2003

(30) Foreign Application Priority Data

Oct. 15, 2001 (JP) ..................................... 2001-317085

(51) Int. Cl.⁷ ............................................ G11B 23/107
(52) U.S. Cl. .................................... 242/348.2; 360/132
(58) Field of Search ......................... 242/348.2; 360/132

(56) References Cited

U.S. PATENT DOCUMENTS

5,570,252 A  10/1996  Sumner et al.
6,034,839 A   3/2000  Hamming

Primary Examiner—John Q. Nguyen
(74) Attorney, Agent, or Firm—Sughrue Mion, PLLC (57) ABSTRACT A recording tape cartridge having: a case which is substantially rectangular and which accommodates a single reel, on which a recording tape is wound, such that the reel is rotatable; an opening formed by cutting off a portion of a front wall of the case which front wall faces a drive device at a time when the recording tape cartridge is loaded into the drive device, the opening being for pulling-out of a leader member which is attached to an end portion of the recording tape; a main surface plate opening and closing the opening; and an operation portion pivotably mounted to the case, and pivotably connected to the main surface plate. Due to an opening/closing member, which is a portion of the drive device, operating the operation portion, the operation portion pivots and moves the main surface plate toward an inner side of a peripheral wall at a front side in a direction of loading the recording tape cartridge into the drive device, so as to open the opening.

23 Claims, 14 Drawing Sheets

RECORDING TAPE CARTRIDGE

BACKGROUND OF THE INVENTION

1. Field of the Invention

The present invention relates to a recording tape cartridge in which a single reel is accommodated within a case, and a recording tape, such as a magnetic tape or the like, which is used as a recording/playback medium of mainly a computer or the like, is wound on the reel.

2. Description of the Related Art

Conventionally, magnetic tape cartridges have been known in which a magnetic tape, which is used as a data recording/playback medium of a computer or the like, is wound on a single reel, and the reel is accommodated within a case. A leader member, which is a leader pin, a leader tape, or a leader block, for example, is provided at the distal end of the magnetic tape. A pull-out means provided at a drive device pulls out the leader member from an opening of the magnetic tape cartridge, and the magnetic tape fixed to the leader member is wound onto a take-up reel of the drive device.

A reel gear is carved in a ring shape at the center of the bottom surface of the reel which emerges from an opening formed in the bottom surface of the magnetic tape cartridge. Due to a driving gear, which is provided at a rotating shaft of the drive device, meshing with the reel gear, the reel is driven to rotate. Further, due to the reel of the magnetic tape cartridge and the take-up reel of the drive device being rotated synchronously, data can be recorded onto the magnetic tape or data recorded on the magnetic tape can be played back.

Figure 12:
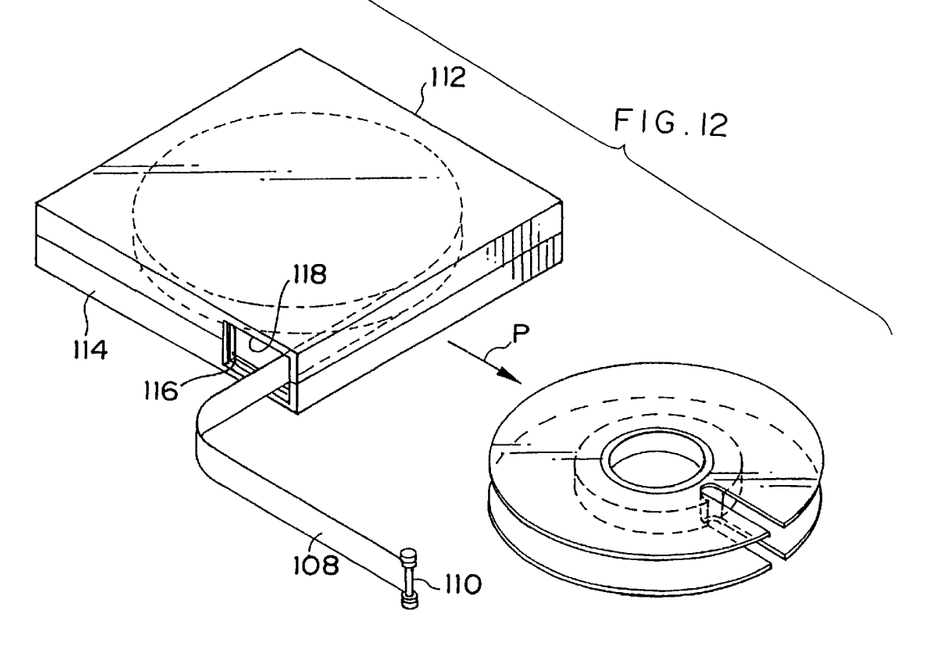
FIG. 12 is a schematic perspective view of a conventional magnetic tape cartridge equipped with a leader pin.
Figure 13:
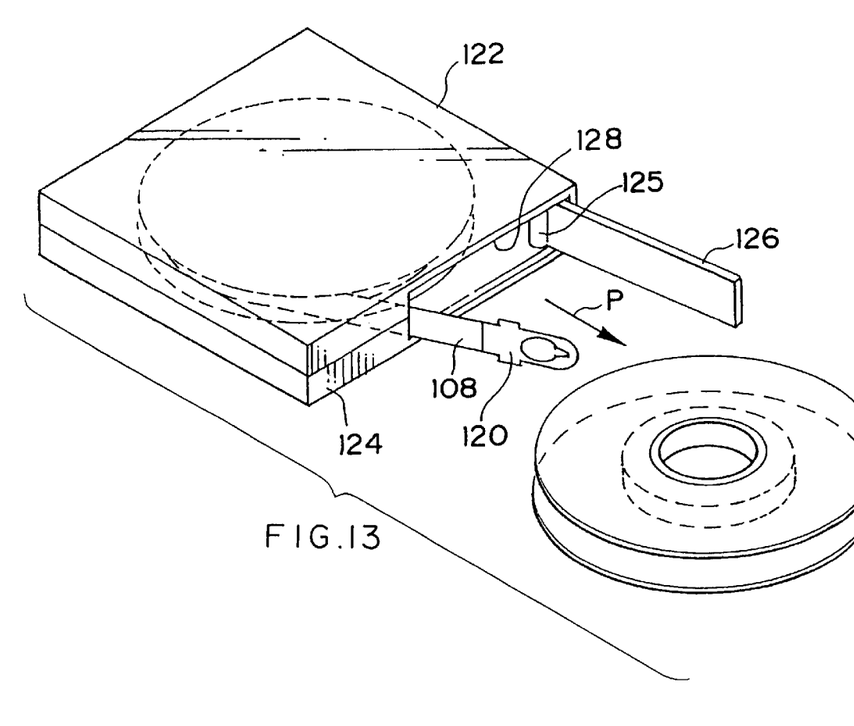
FIG. 13 is a schematic perspective view of a conventional magnetic tape cartridge equipped with a leader tape.
Figure 14:
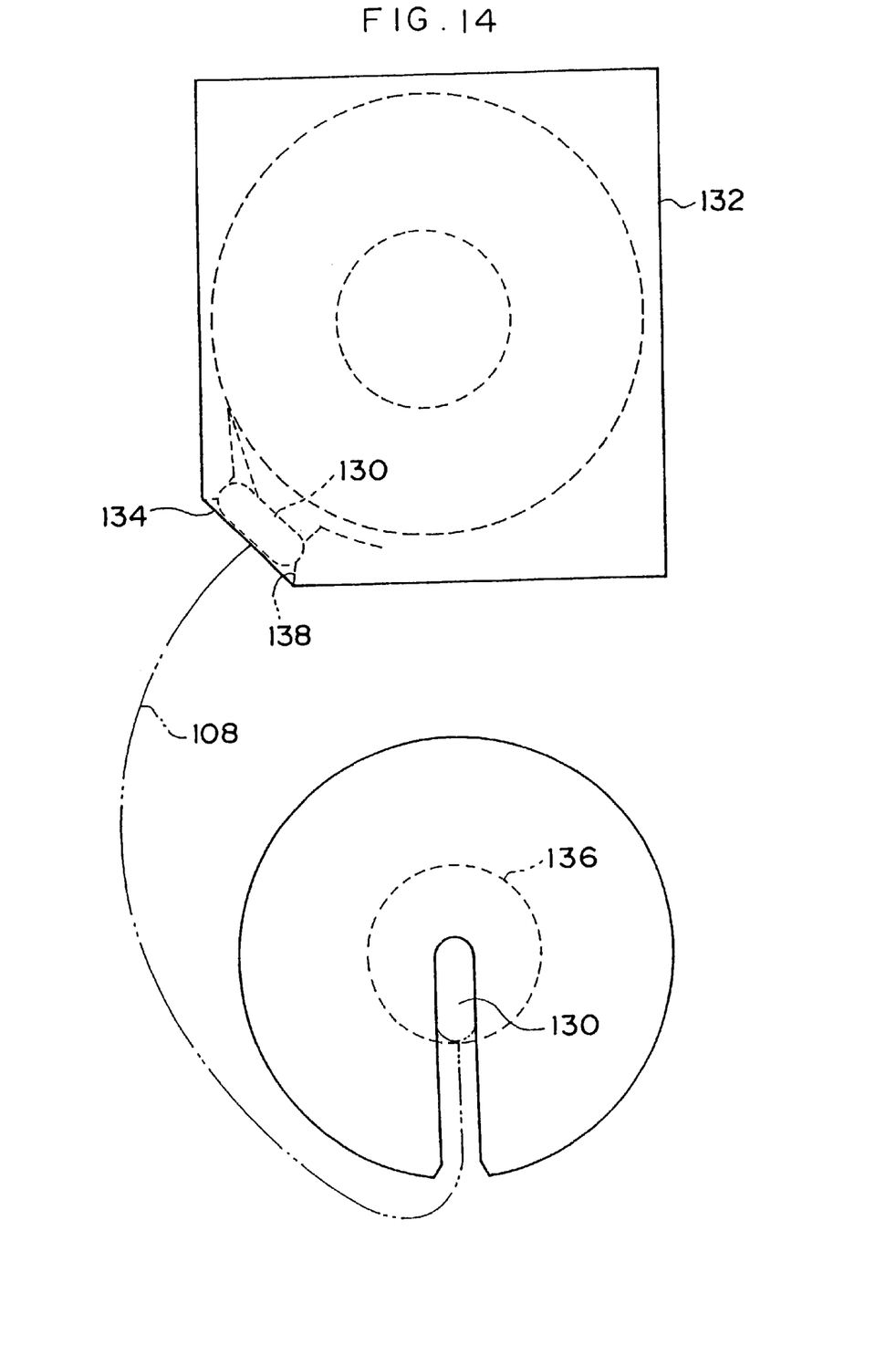
FIG. 14 is a schematic plan view of a conventional magnetic tape cartridge equipped with a leader block.

A large amount of information can be recorded in this magnetic tape cartridge, although little space is needed to accommodate the magnetic tape cartridge when it is stored. As shown in FIGS. 12 through 14, the position of the opening of the magnetic tape cartridge and the type of door for opening and closing the opening differ in accordance with the type of the leader member. Namely, in the case of a leader pin 110, as shown in FIG. 12, an opening 118 is formed in a side wall 114 of a case 112 which side wall 114 is parallel to the direction of loading the magnetic tape cartridge into a drive device (the direction of arrow P). The opening 118 is opened and closed by a door 116 which slides in the same direction as the loading direction.

However, if the opening 118 is provided at the side wall 114 of the case 112 in this way, the pull-out means of the drive device must pull the leader pin 110 out from the left-right lateral direction of the case 112 (i.e., non-rectilinearly). Thus, space for the pull-out means to move around the case 112 must be ensured in the left-right lateral direction of the case within the drive device, and the mechanism for moving the pull-out means around (i.e., non-rectilinearly) becomes complex. In other words, the drawback arises in that the drive device becomes large. Moreover, there is the problem that the path along which a magnetic tape 108 is pulled out becomes long.

Further, in the case of a leader tape 120, as shown in FIG. 13, an opening 128 is formed in a front wall 124 of a case 122 which front wall 124 is orthogonal to the direction of loading the magnetic tape cartridge into a drive device (the direction of arrow P). A door 126, which opens and closes the opening 128, is a pivoting-type door which pivots toward the front around a shaft 125 supported in a vicinity of a corner of the case 122. However, if the opening 128 is provided at the front wall 124 of the case 122 in this way, although there is no need for the pull-out means of the drive device to move non-rectilinearly, the door 126 opens over a wide area toward the front. Therefore, space must be ensured within the drive device such that nothing interferes with the door 126 when the opening 128 is to be opened. In short, a drawback arises in that the drive device becomes large.

Moreover, in the case of a leader block 130, as shown in FIG. 14, an opening 138 is formed by diagonally cutting off a corner portion 134 of the front side of the case in the direction of loading the magnetic tape cartridge into the drive device. The opening 138 is opened and closed directly by the leader block 130. However, if the opening 138 is opened and closed by the leader block 130 in this way (namely, if the leader block also functions as the door for opening and closing the opening), a problem arises in that it is easy for the leader block 130 to become scratched or dirtied. Specifically, the leader block 130 fits together with a reel hub 136 of the drive device and forms a portion of the reel hub 136. Thus, if a scratch is formed in or dirt adheres to the leader block 130, even if the scratch or dirt is a scratch or dirt which is not problematic when the leader block 130 is ordinarily used as the door, it may become difficult for the leader block 130 to fit-together with the reel hub 136, and there is the possibility that problems in the moving of the magnetic tape 108 may arise.

Moreover, the leader block 130 is merely anchored at the edge portion of the opening 138. Thus, there is the drawback that, if the magnetic tape cartridge is dropped or the like, it is easy for the leader block 130 to come apart from the opening 138. Further, because the leader block 130 is larger than the leader pin 110, a problem arises in that the number of constraints on the configuration of the case increases. Namely, the leader pin 110, whose function is separate from that of a door, is technically superior to the leader block 130 which also functions as a door.

SUMMARY OF THE INVENTION

An object of the present invention is to provide a recording tape cartridge in which a door which closes an opening and a leader member for the pulling out of a recording tape are separate members, and which is provided with an opening which makes the pull-out path of the recording tape the shortest, and with a door which can open and close the opening in a small space, so as to aim to make a drive device more compact.

In order to achieve the above-described object, a first aspect of the present invention is a recording tape cartridge comprising: a case which is substantially rectangular and which accommodates a single reel, on which a recording tape is wound, such that the reel is rotatable; an opening formed by cutting off a portion of a front wall of the case which front wall faces a drive device at a time when the recording tape cartridge is loaded into the drive device, the opening being for pulling-out of a leader member which is attached to an end portion of the recording tape; a main surface plate opening and closing the opening; and an operation portion pivotably mounted to the case, and pivotably connected to the main surface plate, wherein due to an opening/closing member of the drive device operating the operation portion, the operation portion pivots and moves the main surface plate toward an inner side of a peripheral wall at a front side in a direction of loading the recording tape cartridge into the drive device, so as to open the opening.

In this way, when the opening is provided by cutting off a front side corner portion of the case, the open surface of the opening can face the direction of loading of the recording tape cartridge into the drive device. Therefore, the pull-out means of the drive device can enter in from the front side, and the path along which the recording tape is pulled out can be made to be the shortest. Accordingly, there is no need at the drive device for a complex mechanism for making the recording tape move non-rectilinearly (i.e., move around the case), and it is possible to design a drive device which is compact and has a low manufacturing cost. Further, because the recording tape passes along the shortest path, wear of the recording tape due to contact with a tape guide can also be reduced.

In the aforementioned structure, due to the operation portion pivoting and moving the main surface plate to the inner side of the peripheral wall of the front side of the case, the opening is opened. Therefore, the main surface plate (the door) can be opened even in a narrow space, and the space within the case and within the drive device can be utilized efficiently. Accordingly, the area for the cartridge within the drive device can be made small, and the drive device can be made compact.

DESCRIPTION OF THE PREFERRED EMBODIMENTS

Hereinafter, a first embodiment of the present invention will be described in detail on the basis of the embodiment shown in the drawings. For convenience of explanation, the direction of loading the recording tape cartridge into a drive device (the direction of arrow P) is called the "front direction", and the other directions of back, left, right, top, and bottom will be specified and expressed on the basis of this front direction. Further, a magnetic tape is used as the recording tape, and hereinafter, explanation will be given with regard to a magnetic tape cartridge.

Figure 1:
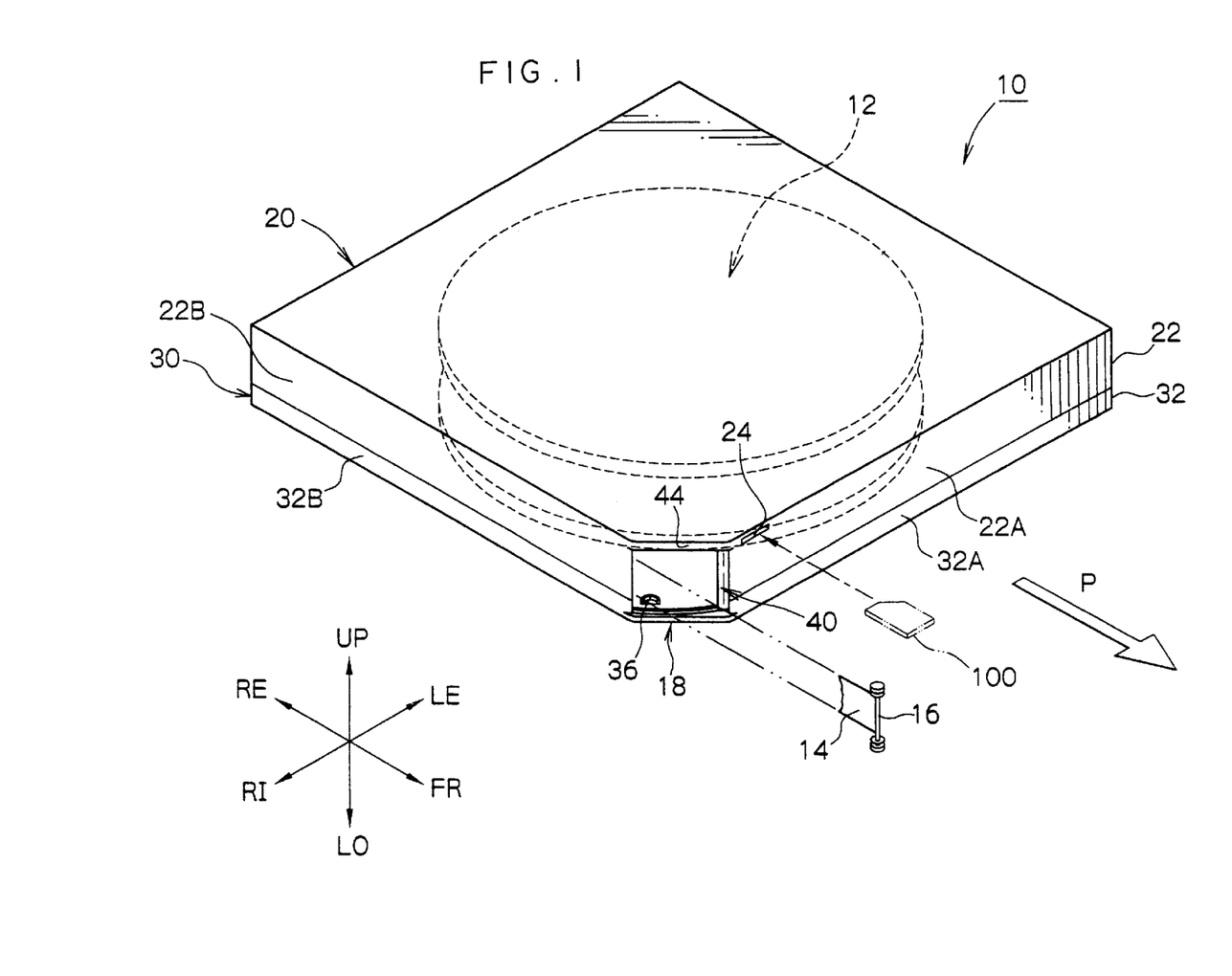
FIG. 1 is a schematic perspective view of a magnetic tape cartridge in accordance with a first embodiment of the present invention.
Figure 2:
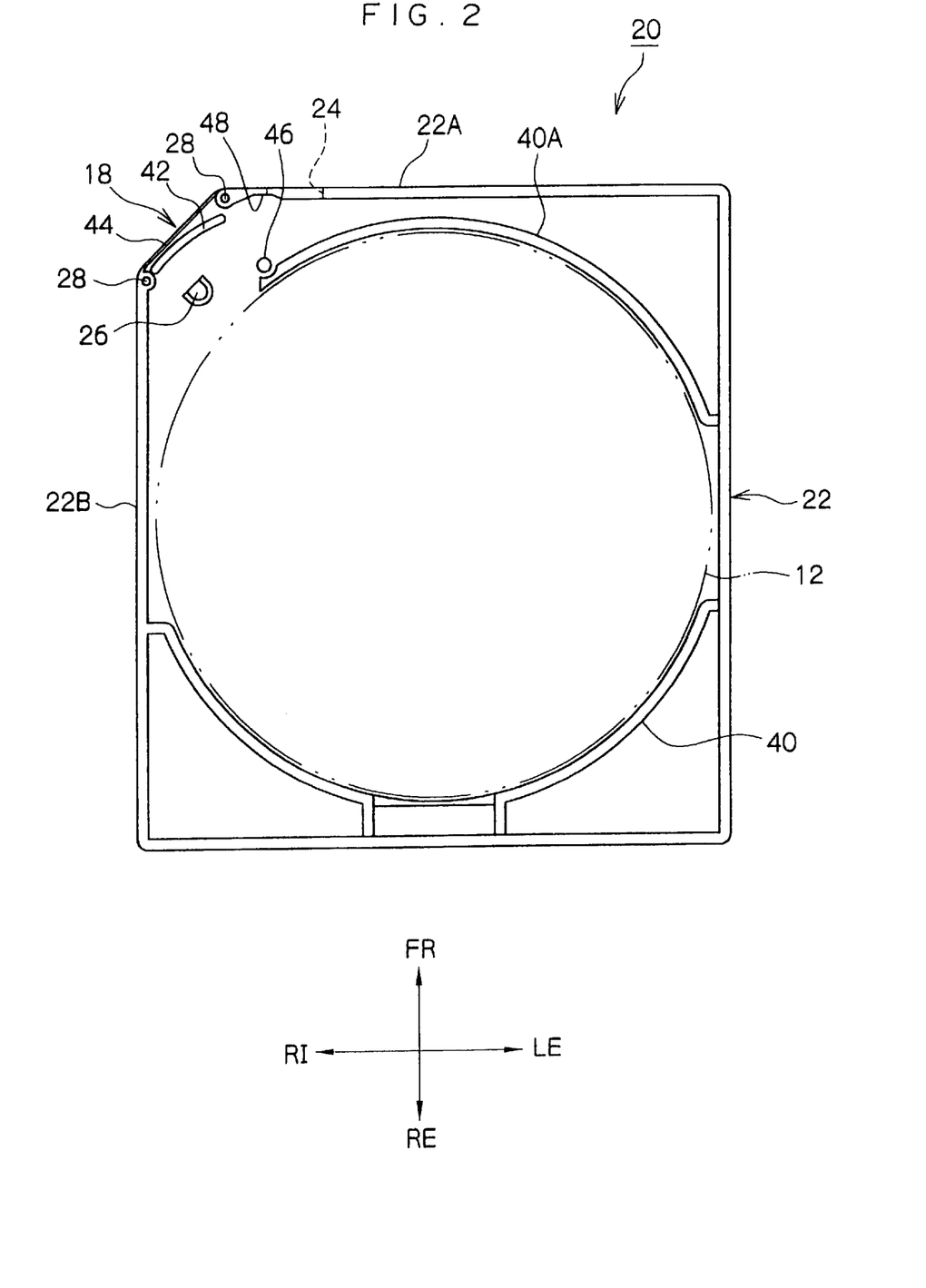
FIG. 2 is a schematic plan view of an upper case of the magnetic tape cartridge of FIG. 1.
Figure 3:
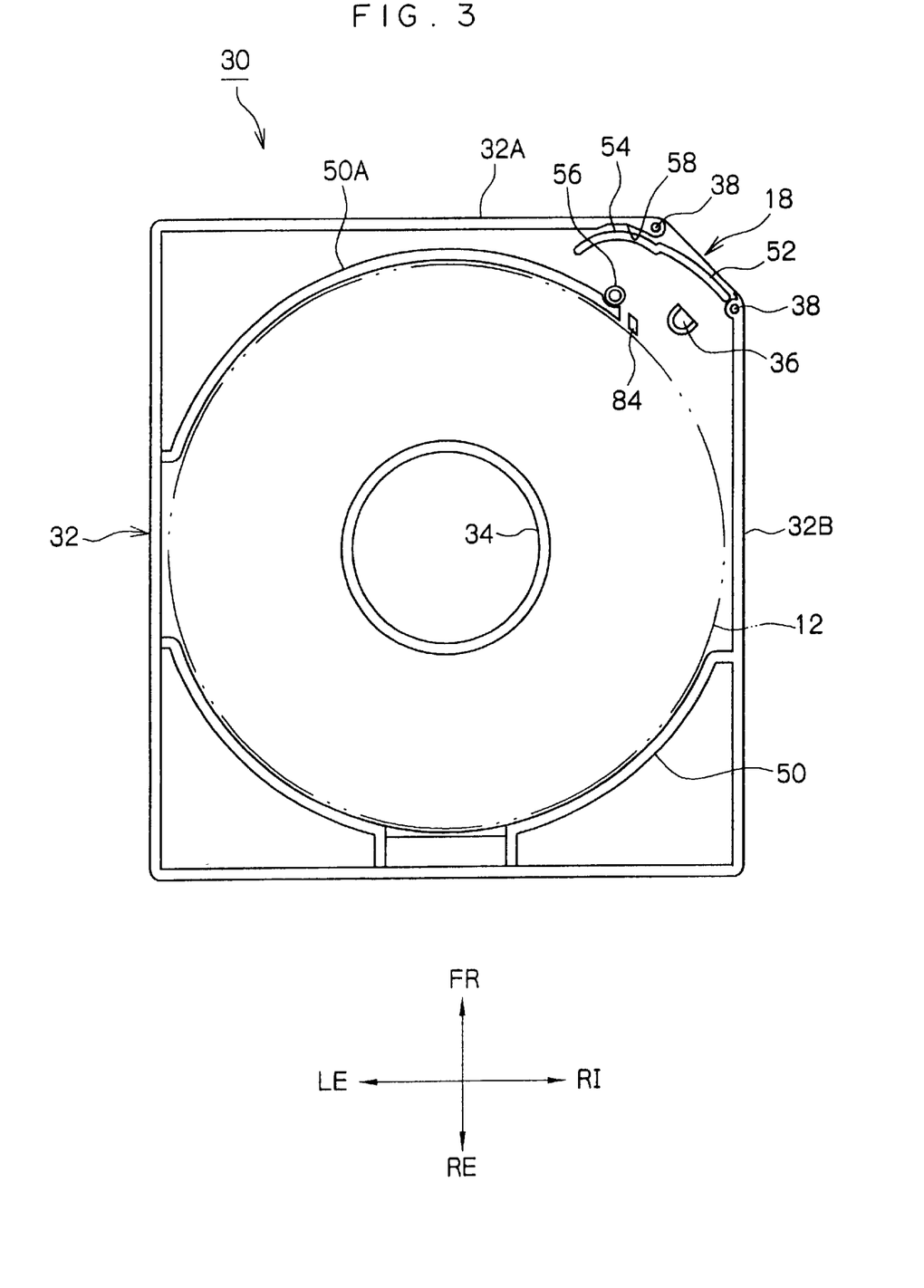
FIG. 3 is a schematic plan view of a lower case of the magnetic tape cartridge of FIG. 1.

As shown in FIGS. 1 through 3, a magnetic tape cartridge 10 is formed in the shape of a substantially rectangular box by an upper case 20 and a lower case 30, respectively formed from a synthetic resin, being joined together in a state in which peripheral walls 22, 32 thereof abut one another (Note that the shape of the cartridge or the cases of the first and other embodiments of the present invention is not limited to a rectangular box, and any modification thereof or even other shapes are also acceptable unless the shapes contradict the spirit of the present invention). A single reel 12, on which is wound a magnetic tape 14 serving as an information recording/playback medium, is rotatably accommodated in the interior of the magnetic tape cartridge 10. A circular opening 34, which is for exposing a reel gear (not illustrated) of the reel 12, is formed substantially in the center of the bottom case 30.

The front, right corner portion of the magnetic tape cartridge 10 is cut off at an incline (of 45° for example) as seen in plan view, and an opening 18 is formed at this portion. This opening 18 is provided for the pulling-out, to the exterior, of the magnetic tape 14 which is wound on the reel 12. When the magnetic tape cartridge 10 is not being used (i.e., when the magnetic tape cartridge 10 is not loaded in a drive device), the opening 18 is closed by a door 60 which will be described later. When the magnetic tape cartridge 10 is being used (i.e., when the magnetic tape cartridge 10 is loaded in a drive device), the door 60 is opened, and a leader pin 16, which is attached to the distal end of the magnetic tape 14, is pulled-out by a pull-out means (not illustrated) of the drive device.

By forming the opening 18 by cutting off a corner portion, the area over which the opening 18 is open is large at the front side peripheral walls (hereinafter called "front walls") 22A, 32A. Thus, the pull-out means pulls the recording tape 14 out rectilinearly. Accordingly, the pull-out path of the magnetic tape 14 can be made to be the shortest. In other words, the drive device can be made more compact, and the manufacturing costs can be reduced. Further, it is thereby possible to reduce wear due to contact with a tape guide (not illustrated) of the drive device.

Screw bosses 28, which do not penetrate through, and screw bosses 38, which do penetrate through, are provided at the right end portions of the front walls 22A, 32A and at the front end portions of right side peripheral walls (hereinafter, "right walls") 22B, 32B forming the opening 18, so that the upper case 20 and the lower case 30 can be fixed together by screws (not shown) which are screwed in from below. Accordingly, rigidity in a vicinity of the opening 18 is ensured, and the drop test number and buckling strength can be improved.

A leader pin 16 is substantially formed in the shape of a dumbbell such that the top end portion and the bottom end portion thereof protrude out with larger diameters than the central portion of the leader pin 16. The distal end of the magnetic tape 14 is fixed by an adhesive or the like to the central portion of the leader pin 16. When the magnetic tape cartridge 10 is not in use, the top end portion and the bottom end portion of the leader pin 16 are anchored respectively on anchor portions 26, 36, which are formed in substantially semicircular arc shapes as seen in plan view and are provided in vicinities of the right walls 22B, 32B of the upper case 20 and the lower case 30, so that the leader pin 16 is held in a vicinity of the opening 18.

Inner walls 40, 50, which are substantially formed as short, hollow cylinders and which have inner diameters slightly larger than the outer diameter of the reel 12 and which regulate the position of the outer peripheral edge of the reel 12, are provided to stand upright at the upper case 20 and the lower case 30. The door 60, which opens and closes the opening 18, is provided slidably between the front walls 22A, 32A and inner walls 40A, 50A at the front sides of the inner walls 40, 50.

Figure 4:
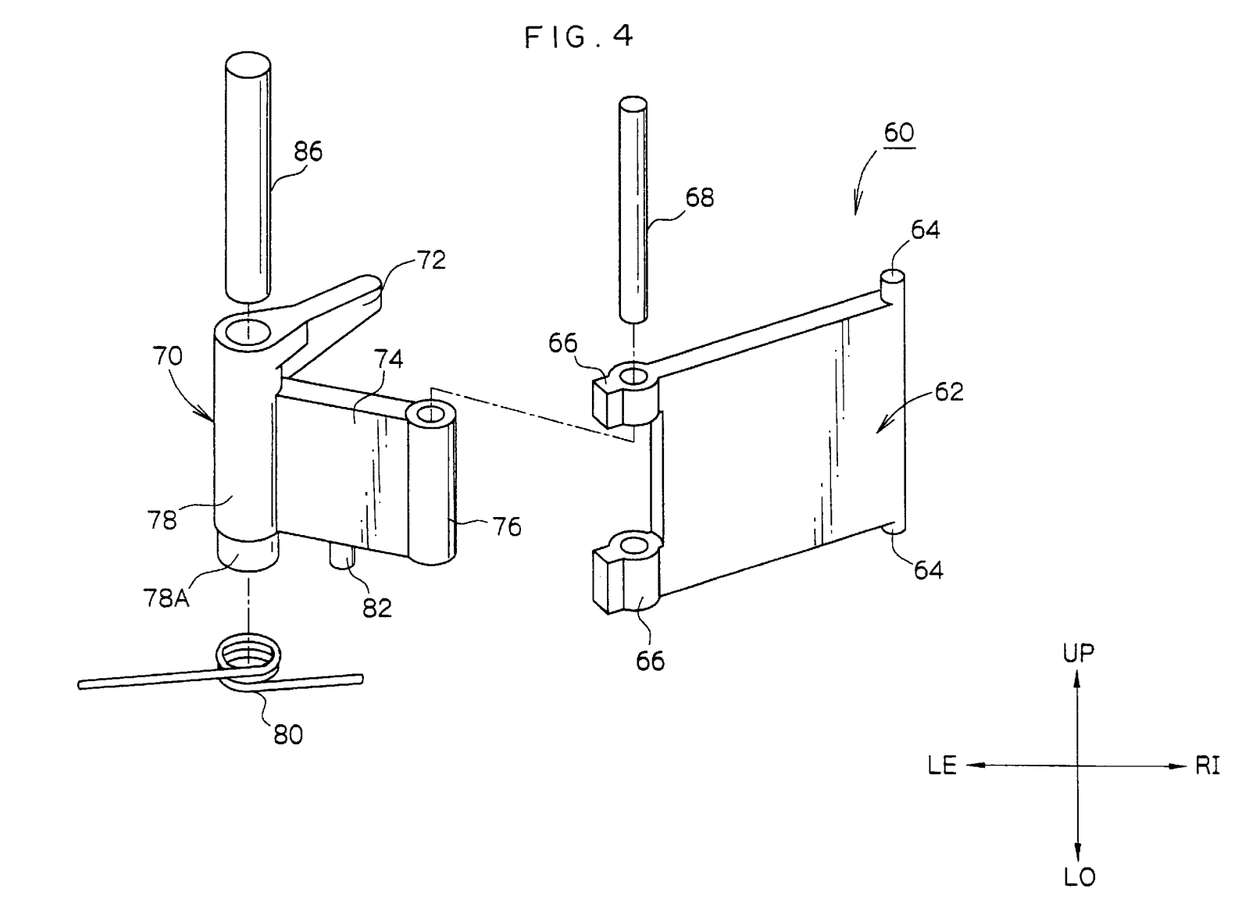
FIG. 4 is an exploded perspective view of a door in accordance with a first embodiment.
Figure 5:
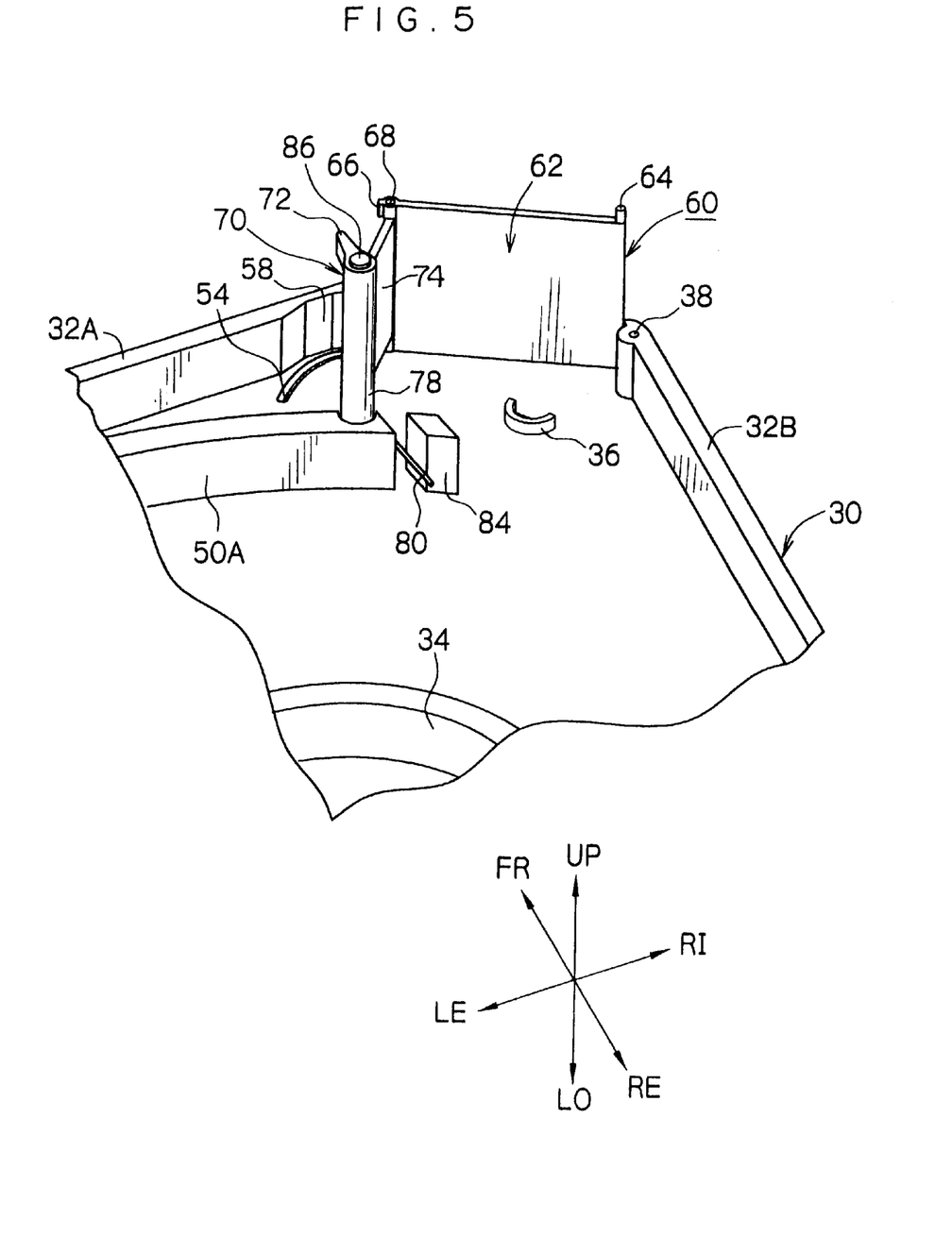
FIG. 5 is a schematic perspective view showing a state in which the door closes an opening.
Figure 6:
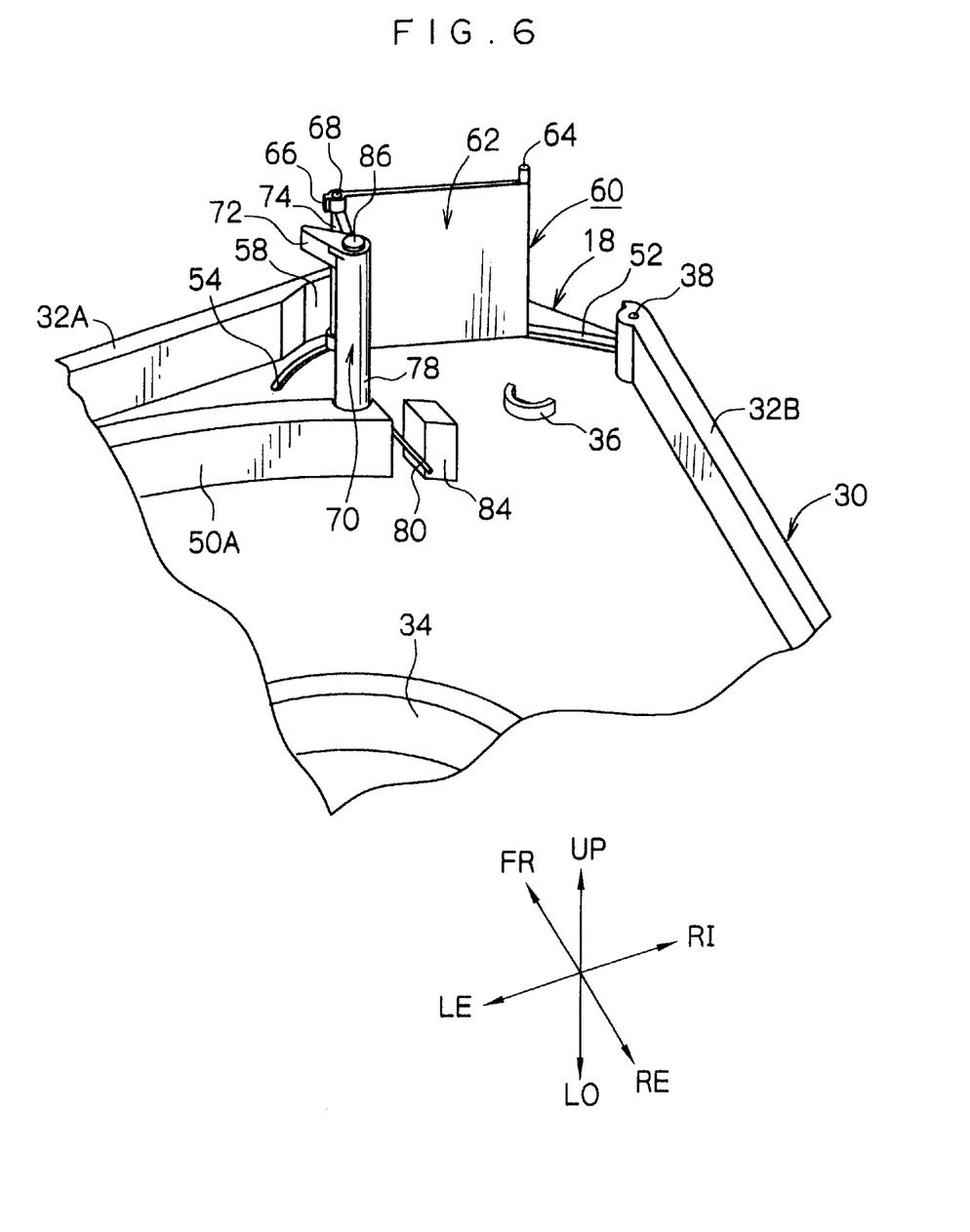
FIG. 6 is a schematic perspective view showing a state in the midst of progression from the state in which the door closes the opening to a state in which the opening is open.
Figure 7:
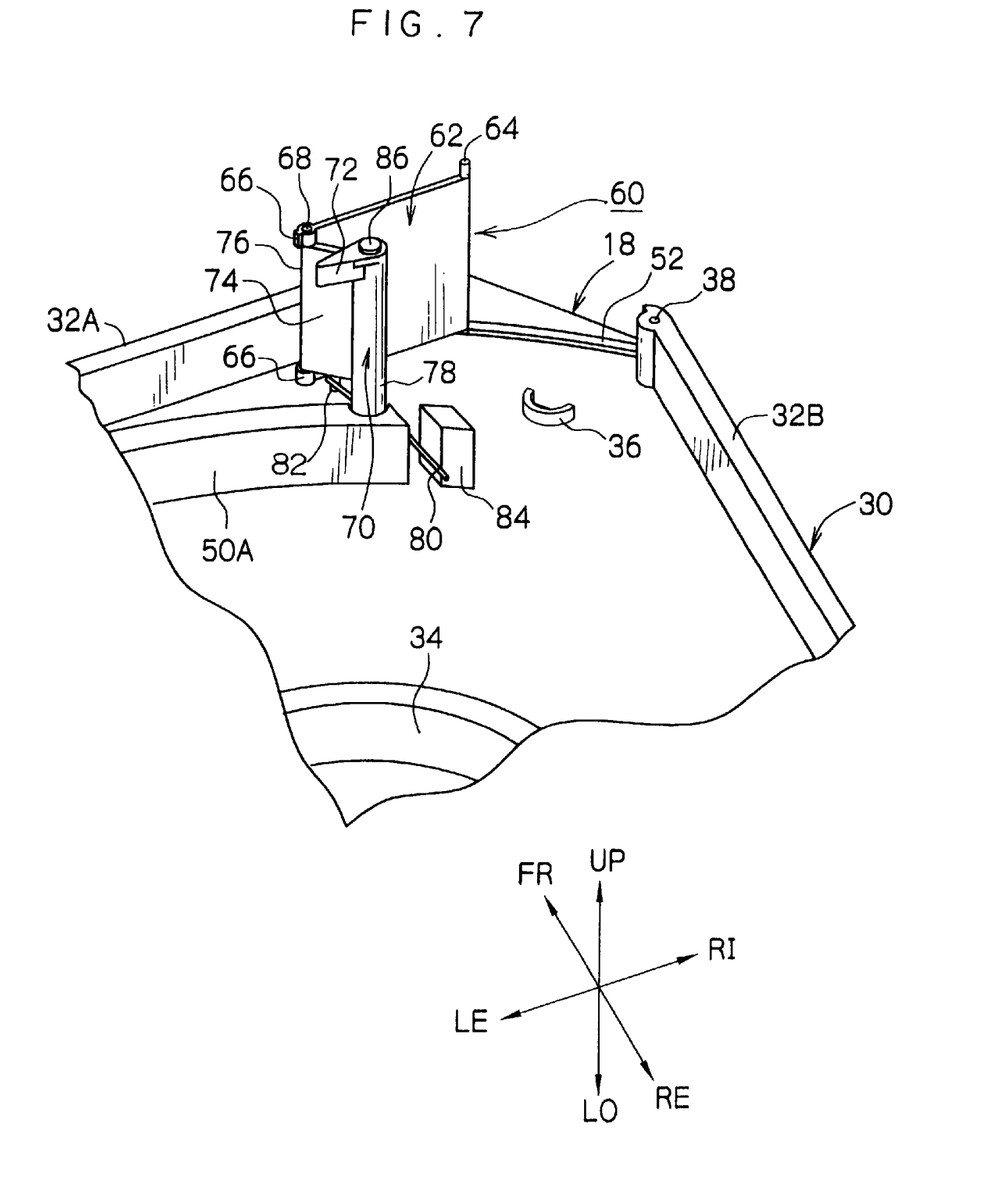
FIG. 7 is a schematic perspective view showing the state in which the door leaves the opening open.
Figure 8:
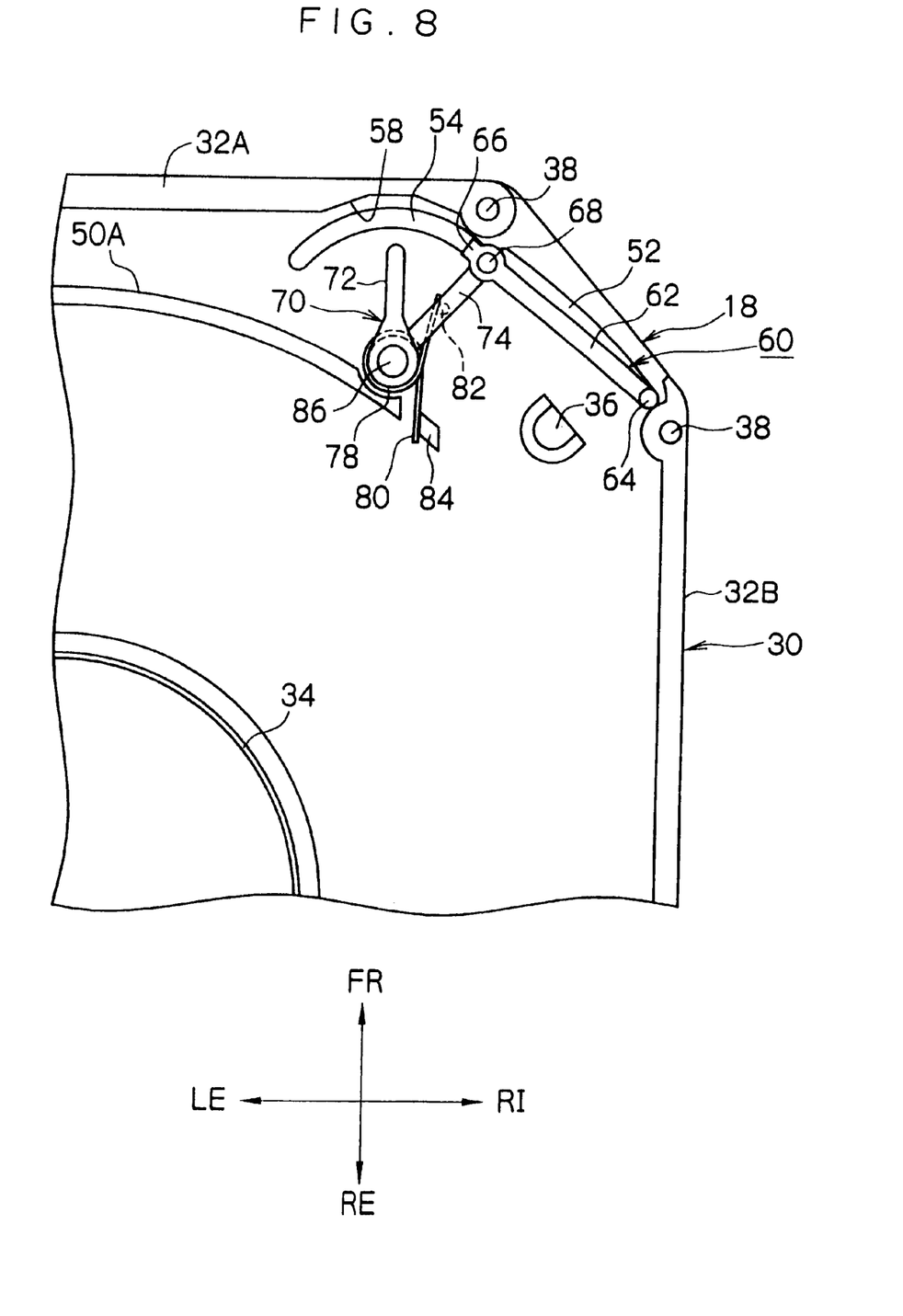
FIG. 8 is a schematic plan view showing the state in which the door closes the opening.
Figure 9:
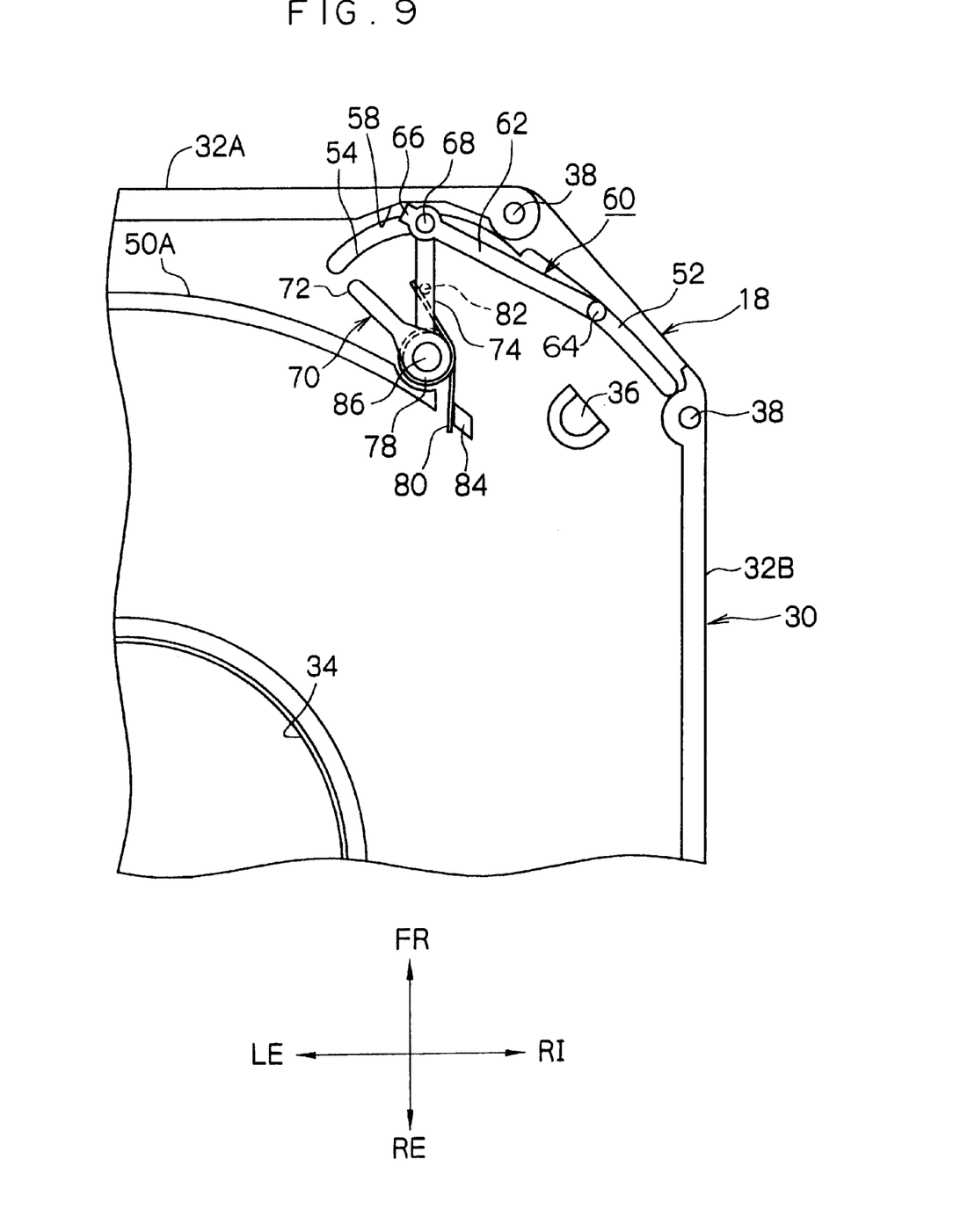
FIG. 9 is a schematic plan view showing a state in the midst of progression from the state in which the door closes the opening to the state in which the opening is open.
Figure 10:
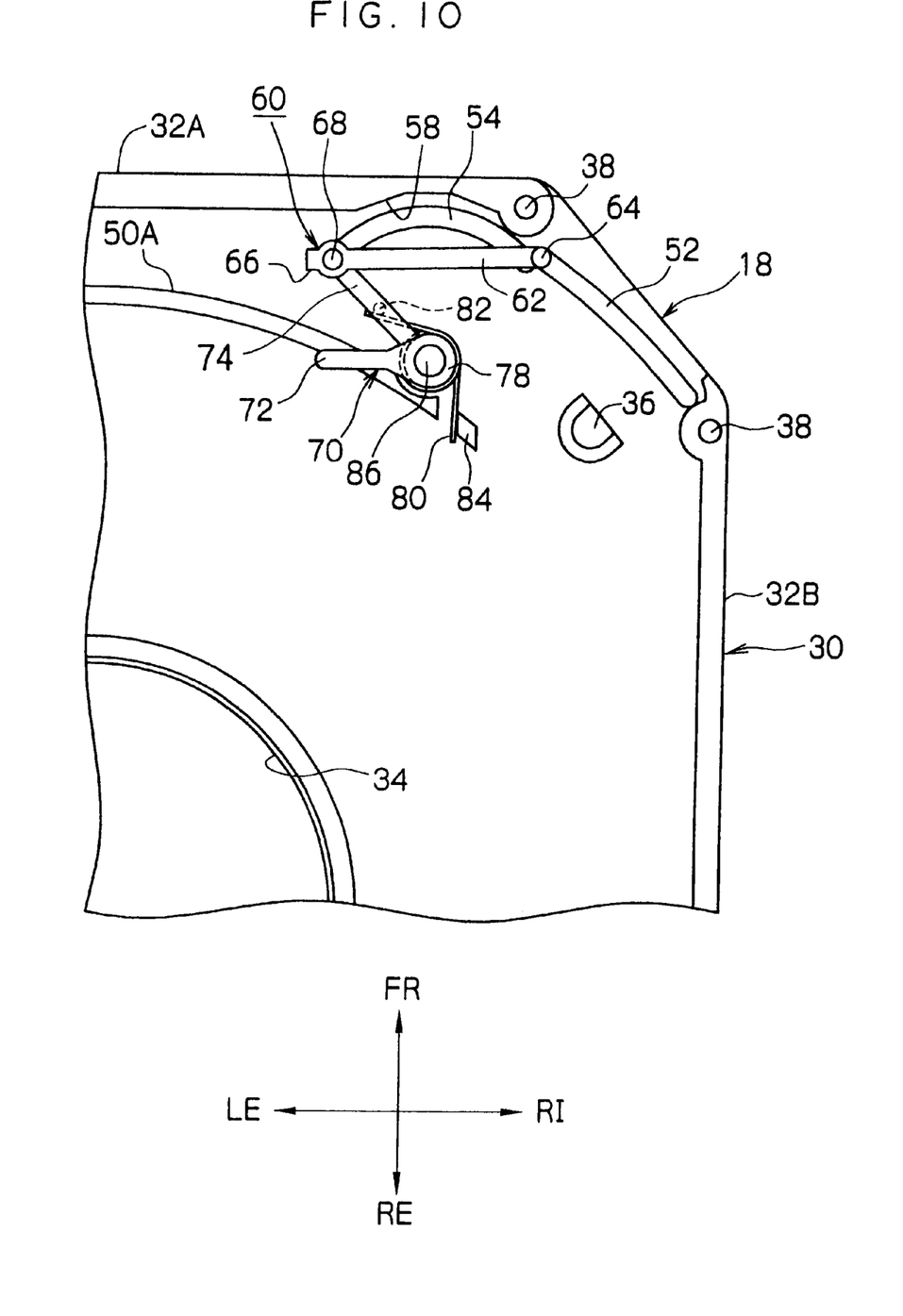
FIG. 10 is a schematic plan view showing the state in which the door leaves the opening open.

As shown in FIG. 4, the door 60 is structured by a main surface plate 62 which opens and closes the opening 18, and an operation portion 70 which slides the main surface plate 62. Substantially solid cylindrical (i.e., rod-shaped) projections 64 project from the top and bottom surfaces of the right end portion of the main surface plate 62. Further, substantially hollow cylindrical connecting portions 66 are provided at the top and bottom portions of the left end portion of the main surface plate 62. The left-right direction length of the main surface plate 62 is substantially equal to the width of the opening 18.

The operation portion 70 has an operation lever 72 which is abutted by an opening/closing member 100 (see FIG. 1) provided at the drive device; a substantially hollow cylindrical pivot shaft 78 with the operation lever 72 integrally connected thereto; a plate-shaped connecting arm 74 extending integrally from the pivot shaft 78; and a substantially hollow cylindrical connecting portion 76 formed at the other end of the connecting arm 74 (i.e., at the end opposite the end where the pivot shaft 78 is provided). The operation lever 72 and the connecting arm 74 form a substantial V-shape as seen in plan view.

By fitting-in the connecting portion 76 of the operation portion 70 between the connecting portions 66 of the main surface plate 62 and by inserting a pin 68 through the connecting portion 76 and the connecting portions 66, the main surface plate 62 and the operation portion 70 are connected so as to be freely pivotable via the connecting portions 66, 76. Note that the pin 68 is structured so as to be prevented from falling out from the connecting portions 66, 76, and so as to not project from the top surface of the connecting portion 66, and so as to project from the bottom surface by a height substantially equal to that of the projection 64.

Further, an anchor portion 82 projects from the bottom surface of the connecting arm 74. One end of a torsion spring 80, which always urges the operation portion 70 toward the right and which always urges the main surface plate 62 in the direction of closing the opening 18, is anchored on the anchor portion 82. The torsion spring 80 is fit on a small diameter portion 78A which is formed at the bottom end portion of the pivot shaft 78 and whose outer diameter is formed to be small.

As shown in FIG. 3, an anchor projection 84, on which the other end of the torsion spring 80 is anchored, stands upright at the right side (i.e., the side toward the right walls 22B, 32B) of the inner wall 50A of the lower case 30 so as to be separated by a slight distance from the inner wall 50A (so as to be separated at least by a distance which allows the other end of the torsion spring 80 to be fit therein). A shaft hole portion 56, which does not penetrate through, is formed at the front side (i.e., the side toward the opening 18) of the inner wall 50A. The bottom end of a shaft 86, which is inserted through the pivot shaft 78, is inserted and fit into the shaft hole portion 56.

A first guide groove 52, which is substantially arc shaped as seen in plan view and into which the projection 64 of the main surface plate 62 can be inserted, is formed in a vicinity of the opening 18 of the lower case 30 so as to have substantially the same length as the width of the opening 18. Further, a second guide groove 54, which is substantially arc shaped as seen in plan view and into which the bottom end of the pin 68 can be inserted, is formed over a predetermined length from the left end portion of the first guide groove 52 toward the left. As shown in FIG. 2, only a shaft hole portion 46 and a first guide groove 42, into which groove the projection 64 is inserted, are formed in the upper case 20, and no portion corresponding to the second guide groove 54 is provided at the upper case 20. The shaft hole portion 46 does not penetrate through, and the upper end of the shaft 86, which is inserted through the pivot shaft 78, is inserted and fit into the shaft hole portion 46.

As shown in FIG. 1, a slit 24, whose width, in the vertical direction, is about 1.5 mm for example, is provided in the upper portion of the front wall 22A of the upper case 20 in a vicinity of the opening 18. The thin plate-shaped opening/closing member 100 of the drive device, which operates the operation lever 72, can enter in through this slit 24. In addition, concave portions 48, 58, which are for prevention of obstruction of the movement of the door 60, are formed at the inner sides of the front walls 22A, 32A at portions corresponding to the place where the second guide groove 54 is provided.

The door 60, which has the above-described structure, is operated to open and close as follows. Namely, as shown in FIGS. 5 through 10, accompanying the loading of the magnetic tape cartridge 10, when the opening/closing member 100 of the drive device is inserted through from the slit 24 of the upper case 20, the opening/closing member 100 abuts the operation lever 72 which is facing the slit 24, and pivots the operation lever 72 to the left around the shaft 86 (the pivot shaft 78).

The connecting arm 74 therefore pivots around the shaft 86 (the pivot shaft 78) against the urging force of the torsion spring 80, and the bottom end of the pin 68 slides toward the left along the second guide groove 54. The main surface plate 62 is thereby pulled toward the left via the connecting portions 66, 76, and the upper and lower projections 64 slide toward the left along the first guide grooves 42, 52. In this way, the opening 18 is opened.

On the other hand, when the door 60 is to be closed, accompanying the ejecting of the magnetic tape cartridge 10, the opening/closing member 100 of the drive device is pulled out from the slit 24. The pushing of the operation lever 72 is thereby cancelled. Thus, the connecting arm 74 is pivoted toward the right around the shaft 86 (the pivot shaft 78) by the urging force of the torsion spring 80, and the pin 68 slides toward the right along the second guide groove 54. The main surface plate 62 is thereby pushed toward the right. Therefore, the upper and lower projections 64 slide toward the right along the first guide grooves 42, 52. The opening 18 is thereby closed.

As described above, because the upper and lower projections 64 are inserted in and slide within the first guide grooves 42, 52 and the pin 68 is inserted in and slides within the second guide groove 54, the door 60 can move while being guided in an appropriate manner. Accordingly, no problems arise in the operations of opening and closing the door 60. Note that, when the opening 18 is to be opened, because the operation lever 72 is positioned higher than the connecting arm 74 and the pin 68 does not project further than the upper surface of the connecting portion 66, the opening/closing member 100 does not interfere with the operation portion 70 or the connecting portion 66.

Further, when the opening 18 is closed, an extremely slight gap (e.g., approximately 0.5 mm) arises between the upper case 20 and the main surface plate 62. However, a wall portion 44 (see FIGS. 1 and 2), which is of a height which can close the gap, stands erect at the outer side of the first guide groove 42 of the upper case 20. Therefore, the dust-proof property of the magnetic tape cartridge 10 can be maintained. Further, in accordance therewith, the projecting height of the anchor portion 26 of the upper case 20 (i.e., the height by which the anchor portion 26 extends downwardly) is formed to be large, and the leader pin 16 is positioned slightly downward. Therefore, it is not difficult to remove the leader pin 16 from the opening 18.

Figure 11:
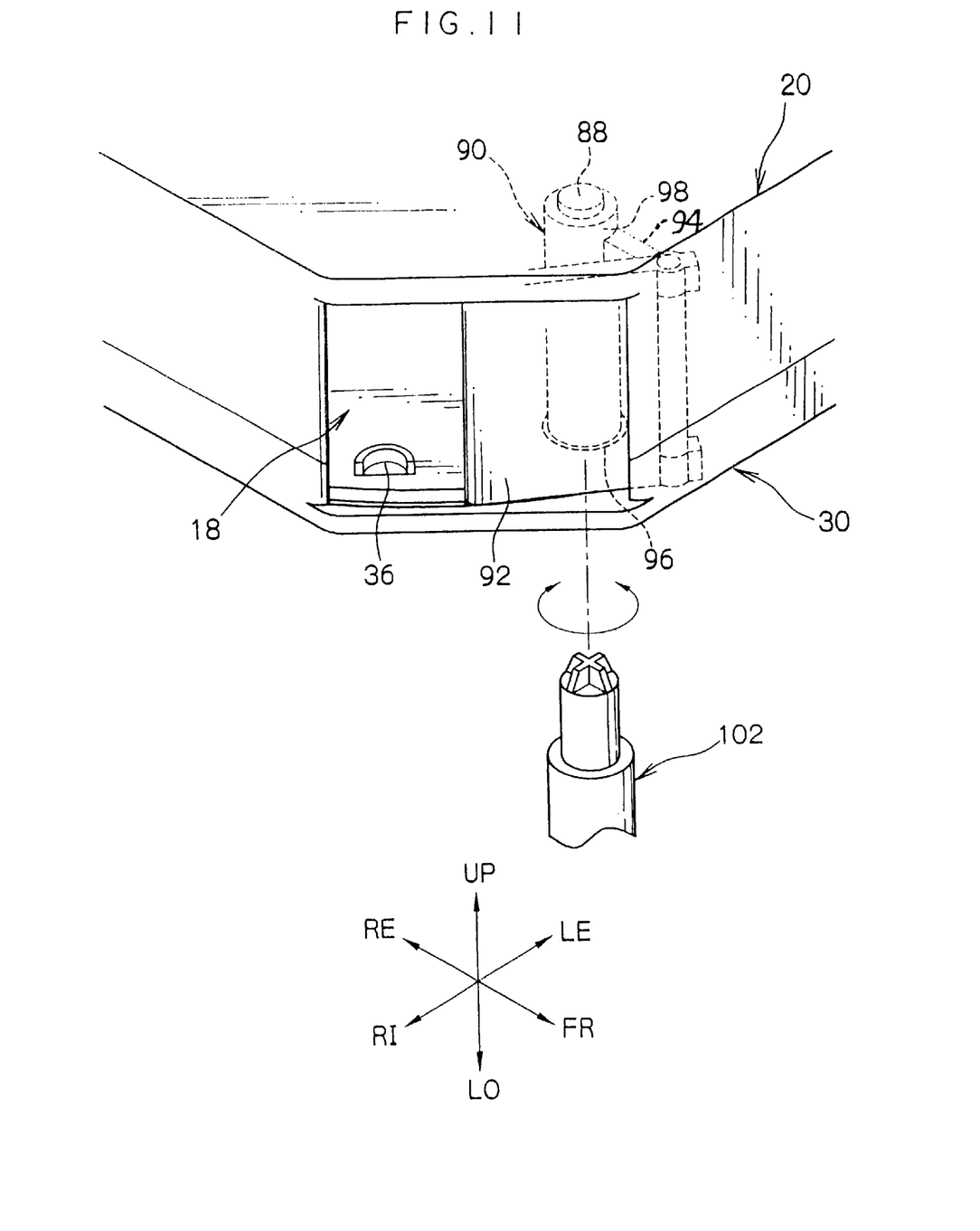
FIG. 11 is a schematic perspective view showing a state in the midst of progression from a state in which a door closes an opening to a state in which the opening is open, in accordance with a second embodiment.

Next, explanation will be given of a door mechanism (door opening/closing means) in accordance with a second embodiment of the present invention. As shown in FIG. 11, a shaft 88, in whose bottom surface a plus-sign-shaped groove or a minus-sign-shaped groove (both unillustrated) or the like is formed, is provided to the inner side of the bottom portion of a pivot shaft 98 of an operation portion 90 at which the operation lever 72 is not provided, such that pivoting is possible due to screw operation. A hole 96, which faces the shaft 88, is formed in the lower case 30. A screwdriver shaft 102, which is in the shape of a plus-sign or a minus-sign or the like, is provided at the drive device. After the magnetic tape cartridge 10 is loaded into the drive device, the screwdriver shaft 102 enters in from the hole 96 and meshes with the groove formed in the bottom surface of the shaft 88.

In accordance with this structure, the shaft 88 (the pivot shaft 98) can be pivoted by the screwdriver shaft 102. Therefore, a connecting arm 94, which extends integrally from the pivot shaft 98, can be moved, and a main surface plate 92 can be moved in the same way as described above. Accordingly, the opening 18 can be opened and closed in the same way as described above.

In either case, the door 60 relating to the present invention moves while being folded over (is folded over while being moved) extremely compactly (i.e., is folded substantially in two). Therefore, only a small space is needed for accommodating the door 60. Accordingly, the present invention can be particularly suitably used if there are constraints on the space required for accommodating the door 60 at the time of opening the opening 18. Further, because the space within the case and within the drive device can thereby be utilized efficiently, less area is needed for accommodating the magnetic tape cartridge 10 within the drive device, and the drive device can be made more compact.

Further, the position at which the leader pin 16 attached to the distal end of the magnetic tape 14 is held can be set over a wide width. Therefore, the region at which the leader pin 16 can be chucked can be made wide, and the degrees of freedom in design of the drive device can be increased. Moreover, because the door 60 is accommodated at the inner sides of the front walls 22A, 32A, even if the opening 18 is provided nearer to the centers of the front walls 22A, 32A rather than at the corner portion, it is possible to open and close the opening 18. Changes in the angle of inclination of the cut-off portion of the corner portion can be utilized for identification of the generation (the difference in capacity) of the recording tape cartridge 10 at a library or the like. Therefore, it is possible to prevent the strength from becoming insufficient, the dust-proof property from deteriorating, and the structure of the metal mold from becoming complex, due to the provision of the opening 18 and an identifying means (an unillustrated hole) as is the case in the conventional art.

In accordance with the present invention, the opening is formed by cutting off the front wall side corner portion of the case. Therefore, the open surface of the opening can be oriented toward the front wall, the pull-out means of the drive device can enter in from the front, and the path along which the recording tape is pulled-out can be made to be the shortest. Accordingly, there is no need at the drive device for a complex mechanism for making the recording tape move around non-rectilinearly, and it is possible to design a drive device which is compact and has a low manufacturing cost.

Further, the opening is opened by the operation portion pivoting and moving the main surface plate toward the inner side of the peripheral wall at the front side of the case. Therefore, the main surface plate can be opened even in a narrow space, and the space within the case and within the drive device can be utilized efficiently. Accordingly, the area for the cartridge within the drive device can be made small, and the drive device can be made compact.

What is claimed is:

1. A recording tape cartridge comprising:
    a case which is substantially rectangular and which accommodates a single reel, on which a recording tape is wound, such that the reel is rotatable;
    an opening formed by cutting off a portion of a front wall of the case which front wall faces a drive device at a time when the recording tape cartridge is loaded into the drive device, the opening being for pulling-out of a leader member which is attached to an end portion of the recording tape;
    a main surface plate for opening and closing the opening; and
    an operation portion pivotably mounted to the case, and pivotably connected to the main surface plate,
    wherein due to an opening/closing member, which is a portion of the drive device, operating the operation portion, the operation portion pivots and moves the main surface plate toward an inner side of a peripheral wall at a front side in a direction of loading the recording tape cartridge into the drive device, so as to open the opening.

2. The recording tape cartridge of claim 1, wherein the opening is formed by cutting off a corner portion of the case at the front side in the direction of loading the recording tape cartridge into the drive device.

3. The recording tape cartridge of claim 1, wherein the opening is formed by cutting off a portion of the case toward a center of the front wall of the case.

4. The recording tape cartridge of claim 1, wherein the operation portion includes an operation lever which the opening/closing member abuts, a pivot shaft which is shaped as a substantially hollow cylinder and to which the operation lever is connected integrally, a connecting arm which is plate-shaped and which extends integrally from the pivot shaft, and a connecting portion which is shaped as a substantially hollow cylinder and which is provided at an end of the connecting arm at a side opposite a side at which the pivot shaft is provided, and the operation portion is structured such that the operation lever and the connecting arm form a substantial V-shape as seen in plan view, and the operation portion is set in a vicinity of the opening so as to be pivotable around the pivot shaft.

5. The recording tape cartridge of claim 4, wherein the connecting portion and one end of the main surface plate are pivotably connected via a pin, and therefore, when the operation lever is pushed by the opening/closing member and pivots, interlockingly therewith, the connecting arm, the connecting portion, and the main surface plate move.

6. The recording tape cartridge of claim 5, further comprising:
   a first groove formed in a lower inner surface of the case along a circumference whose center is the pivot shaft and whose radius is substantially a length of the connecting arm; and
   a second groove which is substantially arc shaped as seen in plan view and which is formed at least in the lower inner surface of the case,
   wherein the pin engages with the first groove, a projection provided at another end of the main surface plate engages with the second groove, and the pin is thereby guided along the first groove and the other end of the main surface plate is thereby guided along the second groove.

7. The recording tape cartridge of claim 4, further comprising an urging member which urges the pivot shaft in a direction in which the main surface plate closes the opening.

8. The recording tape cartridge of claim 7, wherein, due to the opening/closing member pushing the operation lever, the pivot shaft is driven in a direction of opening the opening against the urging of the urging member.

9. The recording tape cartridge of claim 8, wherein the urging member is a torsion spring.

10. The recording tape cartridge of claim 4, further comprising a slit formed in the case so that the opening/closing member can abut the operation lever.

11. The recording tape cartridge of claim 1, wherein the operation portion has a pivot shaft which is formed in a substantially hollow cylindrical shape and which has a portion with which the opening/closing member can engage, a connecting arm which is plate-shaped and which extends integrally from the pivot shaft, and a connecting portion which is formed in a substantially hollow cylindrical shape and which is provided at an end of the connecting arm at a side opposite a side at which the pivot shaft is provided, and the operation portion is set in a vicinity of the opening so as to be pivotable around the pivot shaft.

12. The recording tape cartridge of claim 11, wherein a portion of the case where the pivot shaft is set is structured such that engagement of the opening/closing member and the portion of the pivot shaft with which the opening/closing member can engage is possible, and driving of the pivot shaft by the opening/closing member is possible.

13. The recording tape cartridge of claim 11, wherein the connecting portion and one end of the main surface plate are pivotably connected via a pin, and therefore, when the pivot shaft is pivoted by the opening/closing member, interlockingly therewith, the connecting arm, the connecting portion, and the main surface plate move.

14. The recording tape cartridge of claim 13, further comprising an urging member which urges the pivot shaft in a direction in which the main surface plate closes the opening.

15. The recording tape cartridge of claim 14, wherein the opening/closing member drives and rotates the pivot shaft in a direction of opening the opening, against the urging of the urging member.

16. The recording tape cartridge of claim 15, wherein the urging member is a torsion spring.

17. A recording tape cartridge comprising:
   a case which is substantially rectangular and which accommodates a single reel, on which a recording tape is wound, such that the reel is rotatable;
   an opening formed by cutting off a portion of a front wall of the case which front wall faces a drive device at a time when the recording tape cartridge is loaded into the drive device, the opening being for pulling-out of a leader member which is attached to an end portion of the recording tape;
   a main surface plate for opening and closing the opening; and
   an operation portion for opening and closing the main surface plate,
   wherein the operation portion has a pivot shaft which is formed in a substantially hollow cylindrical shape and which has a portion with which an opening/closing member, which is one portion of the drive device, can engage, a connecting arm which is plate-shaped and which extends integrally from the pivot shaft, and a connecting portion which is formed in a substantially hollow cylindrical shape and which is provided at an end of the connecting arm at a side opposite a side at which the pivot shaft is provided, and the operation portion is mounted to the case so as to be pivotable around the pivot shaft, and is connected pivotably to the main surface plate.

18. The recording tape cartridge of claim 17, wherein the connecting portion and one end of the main surface plate are pivotably connected via a pin, and therefore, when the pivot shaft is driven by the opening/closing member and is rotated, interlockingly therewith, the connecting arm, the connecting portion, and the main surface plate move.

19. The recording tape cartridge of claim 18, further comprising:
   first guide means, provided at a lower inner surface of the case, for guiding movement of the pin; and
   second guide means, provided at least at the lower inner surface of the case, for guiding movement of another end of the main surface plate.

20. The recording tape cartridge of claim 17, further comprising an urging member which urges the pivot shaft in a direction in which the main surface plate closes the opening.

21. The recording tape cartridge of claim 20, wherein the opening/closing member drives the pivot shaft in a direction of opening the opening, against the urging of the urging member.

22. The recording tape cartridge of claim 21, wherein the urging member is a torsion spring.

23. The recording tape cartridge of claim 17, wherein an operation lever, which the opening/closing member can abut, is provided integrally to the pivot shaft, and the operation lever and the connecting arm are structured so as to form a substantial V shape in plan view.

* * * * *